(12) United States Patent
Young et al.

(10) Patent No.: US 8,159,709 B2
(45) Date of Patent: Apr. 17, 2012

(54) METHOD FOR CANCELING A PRINT JOB SUBMITTED TO A PRINTER

(75) Inventors: Kenneth Huang Young, Foster City, CA (US); Randy Cruz Soriano, San Leandro, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 1052 days.

(21) Appl. No.: 12/059,516

(22) Filed: Mar. 31, 2008

(65) Prior Publication Data

US 2009/0244621 A1   Oct. 1, 2009

(51) Int. Cl.
  *G06F 15/00* (2006.01)
  *G06K 1/00* (2006.01)
  *G06K 15/00* (2006.01)
  *G06F 3/12* (2006.01)

(52) U.S. Cl. ...................... 358/1.16; 358/1.13

(58) Field of Classification Search .................. 358/1.16, 358/1.15, 1.13, 1.14
  See application file for complete search history.

(56) References Cited

U.S. PATENT DOCUMENTS

| | | | |
|---|---|---|---|
| 7,158,243 B2 | 1/2007 | Sakamoto et al. | |
| 7,242,488 B2 | 7/2007 | Matsueda | |
| 7,595,907 B2 * | 9/2009 | Carney et al. | 358/1.15 |
| 2002/0021453 A1 | 2/2002 | Sakamoto et al. | |
| 2002/0144023 A1 | 10/2002 | Kawabata et al. | |
| 2002/0186400 A1 | 12/2002 | Matsueda | |
| 2004/0190039 A1 | 9/2004 | Lay et al. | |
| 2004/0218204 A1 | 11/2004 | Nomura | |

* cited by examiner

*Primary Examiner* — Douglas Tran
(74) *Attorney, Agent, or Firm* — Chen Yoshimura LLP

(57) ABSTRACT

A print job canceling method for a printer is described and is especially useful in a printer with relatively small buffer memory. When a print job is cancelled by the user using the printer's control panel, this method allows the printer controller to receive additional print jobs while the current job is being cancelled, without having to notify the host to stop sending the current print job. The printer controller reduces the memory allocated to the job being cancelled. The printer controller continues to accept data for the current job from the host, but does not print the received data. The data is subsequently flushed from the memory. The printer controller also assigns a lower priority to the print job being cancelled. Meanwhile, the remaining memory can be used to receive and print additional print jobs.

18 Claims, 4 Drawing Sheets

METHOD FOR CANCELING A PRINT JOB SUBMITTED TO A PRINTER

BACKGROUND OF THE INVENTION

1. Field of the Invention

This invention relates to a printing method, and in particular, it relates to a method for handling cancellation of a print job submitted to a printer.

2. Description of Related Art

For a raster printer, a print job is rasterized on the host computer before it is sent to the printer controller. The size of the print job data is relatively large, typically much larger than the size of printer data in the PDL (page description language) format. Due to the low cost of raster printers, the memory size on the printer controller is typically relatively small. Therefore, the printer controller normally can only store a limited number of raster jobs submitted to the printer by the host computer(s). For a print job that has many pages, once the memory on the print controller is depleted for the current job, the printer has to keep the host waiting before accepting more pages for the current job. The host sends data in chunks once enough memory is available in the printer controller memory. In the meantime, because the memory is exhausted, the controller cannot take more print job data from the same host or other hosts.

Sometimes a user may cancel a print job using a button on the printer's control panel after the host computer has started to send the print job to the printer. When a job is cancelled from the printer, if the host continues to send print data to the printer and if the print job is relatively large, the data will continue to exhaust the printer controller memory. A job canceling method has been proposed where the printer controller notifies the host so that the host stops generating and sending data to the printer controller. This allows the printer controller to free up its memory to accept other print jobs from the same host or other hosts.

SUMMARY

The present invention is directed to a print job canceling method that substantially obviates one or more of the problems due to limitations and disadvantages of the related art.

An object of the present invention is to provide a print job canceling method that allows the same host or other hosts to send data to the printer while the current job (especially a relatively large job) is being cancelled.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a printing method executed by a printer, which includes: (a) allocating a first memory area for a first print job; (b) receiving from a first host a plurality of pages of print data for the first print job and placing the pages of print data within the first memory area; (c) printing the pages of print data in the first memory area; (d) determining whether a cancel request to cancel the first print job is received from a control panel of the printer; and (e) if the cancel request is received, (e1) allocating a second memory area for the first print job, the second memory area being smaller than the first memory area; and (e2) continuing to receive from the first host a plurality of pages of print data for the first print job, placing the pages of print data within the second memory area, and flushing the print data from the second memory area without printing the print data.

The method may further include, while performing step (e2): (f) allocating a third memory area for a second print job, the third memory area being smaller than the first memory area; (g) receiving from a second host a plurality of pages of print data for the second print job and placing the pages of print data within the third memory area; and (h) printing the pages of print data in the third memory area.

In another aspect, the present invention provides a computer program product that causes a data processing apparatus to perform the above method.

In another aspect, the present invention provides a printer which includes: a printer controller; a buffer memory; a print engine for forming images on recording media; and an operation control unit for receiving commands from a user; wherein the printer controller is programmed (a) to allocate a first memory area of the buffer memory for a first print job, (b) to receive from a first host a plurality of pages of print data for the first print job and place the pages of print data within the first memory area, (c) to print the pages of print data in the first memory area, (d) to determine whether a cancel request to cancel the first print job is received from the operation control unit, and (e) if the cancel request is received, (e1) to allocate a second memory area for the first print job, the second memory area being smaller than the first memory area, and (e2) to continue to receive from the first host a plurality of pages of print data for the first print job, place the pages of print data within the second memory area, and flush the print data from the second memory area without printing the print data.

The printer controller may be further programmed (f) to allocate a third memory area for a second print job, the third memory area being smaller than the first memory area, (g) to receive from a second host a plurality of pages of print data for the second print job and place the pages of print data within the third memory area, and (h) print the pages of print data in the third memory area.

It is to be understood that both the foregoing general description and the following detailed description are exemplary and explanatory and are intended to provide further explanation of the invention as claimed.

DETAILED DESCRIPTION OF PREFERRED EMBODIMENTS

According to embodiments of the present invention, when a print job is cancelled by the user from the printer, the printer controller manipulates the buffer memory in the controller so that while the current job is being cancelled, additional print jobs can be received from the same host or other hosts and printed, even when the current print job is relatively large and would have otherwise exhausted the entire printer controller memory. According to embodiments of the present invention, the printer need not notify the host to stop sending the current print job (the print job being cancelled by the printer). Rather, the printer controller allocates a smaller amount of the memory to receive the print data for the current job. The printer controller continues to accept data for the current print job from the host, but does not print the received data. The data is subsequently flushed from the memory. The printer controller also assigns a lower priority (e.g. in terms of CPU time) to the current print job. Meanwhile, the remaining memory can be used to receive and print newly received print jobs.

Figure 1:
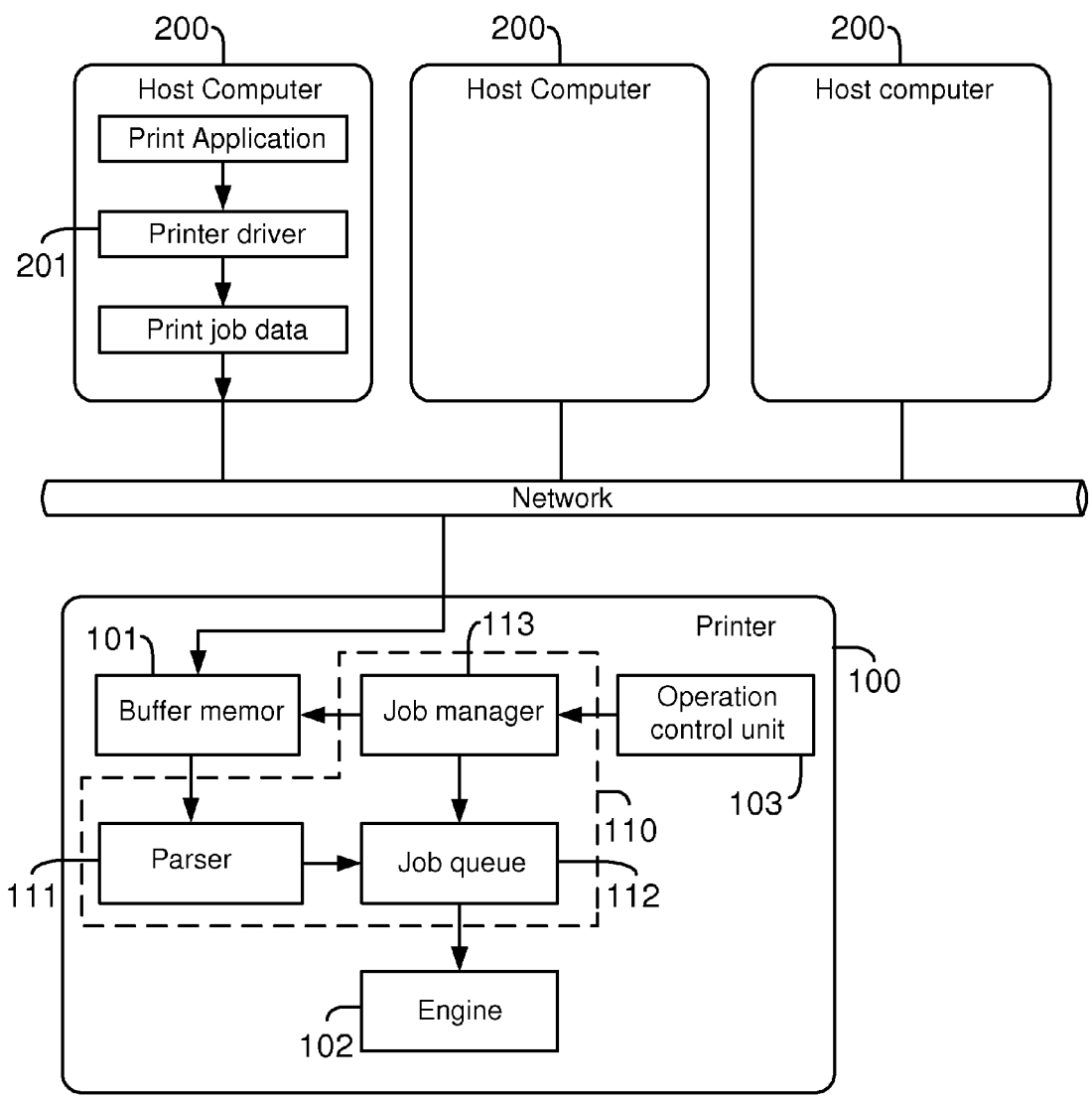
FIG. 1 illustrates a host and printer system according to an embodiment of the present invention.
Figure 2:
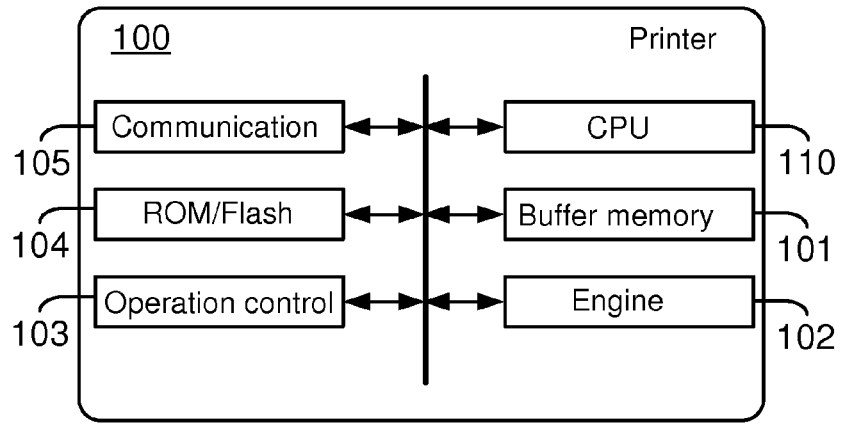
FIG. 2 illustrates a printer according to an embodiment of the present invention.

FIG. 1 illustrates a system according to an embodiment of the present invention, where a plurality of host computers 200 and a printer 100 are connected to each other via a network. FIG. 2 illustrates the hardware structure of the printer 100. As shown in FIGS. 1 and 2, the printer 100 includes a printer controller 110 (implemented by a processor), a buffer memory 101, a print engine 102 for forming images on recording media such as paper, an operation control unit and associated circuitry 103, memory 104 (e.g. ROM or flash memory) for storing firmware of the printer controller, and a communication section 105 for handling communication with the host computers. The printer controller 110 has various functional sections, including a parser 111, a job queue 112, and a job manager 113. The operator control unit 103 includes various buttons or keys on the printer 100 to allow a user to enter various commands to the printer, including a cancel request to cancel a job currently being printed or a job in the printer's queue waiting to be printed.

The arrows in FIG. 1 generally indicate the flow of data and command. A printer driver 201 on the host computer 200 generates print job data, which includes raster image data (or other forms of data) along with PDL (page description language) commands, and transfers the print job data to the printer 100 via the network. The print job data is buffered in the buffer memory 101 of the printer. The parser 111 parses through the data, including examining the PDL commands which contain job ticket parameters, searching for the raster image data (or other forms of data), etc. The job ticket parameters describe the requirements of the print job, such as paper size, layout, etc. After parsing, the print job is sent to the job queue 112, which is a queue for storing print jobs to be printed by the print engine 102. The job queue stores, for each job, information such as job name, job ID, priority, job source (e.g. the IP address of the host computer) and a pointer to a location in buffer memory where the actual data is stored. The job manager 113 implements a job canceling method by managing the buffer memory 101.

Figure 3:
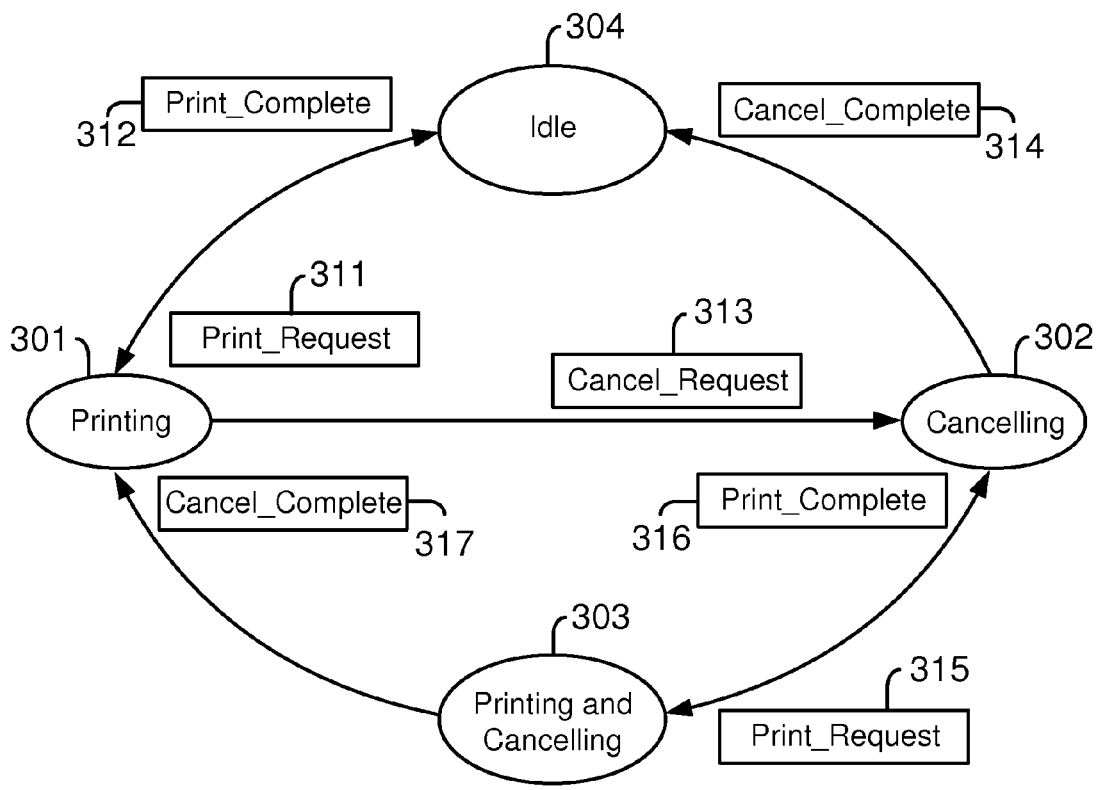
FIG. 3 is a state diagram showing the states of the printer controller.

FIG. 3 is a state diagram showing the states of the printer controller 110 relevant to the job canceling method. The four states of the printer controller are an idle state 304, a printing state 301, a canceling state 302, and a printing and canceling state 303. In the idle state 304, the printer controller waits for a print job or other commands to be received from a host computer 200, or commands to be entered from the operation control unit 103. The printer controller enters the printing state 301 from the idle state 304 when a print request event 311 is received from a host computer 200. In the printing state 301, the printer controller controls the print engine 102 to print the raster image data received from the host computer 200. The printer controller returns to the idle state 304 from the printing state 301 when the printing is completed and a print complete event 312 is received.

If the printer controller is in the printing state 301 and a cancel request event 313 is received, it enters the canceling state 302 to cancel the job being printed. The cancel request event 313 is triggered when the user requests to cancel the current print job using the operation control unit 103 on the printer 100. In the canceling state 302, the printer controller controls the print engine 102 to stop printing. While the print job data from the host computer 200 continues to arrive, the data is continuously flushed out of the buffer memory 101. Canceling is complete when all data from the host computer 200 is received and flushed out of the buffer memory 101. The printer controller returns to the idle state 304 from the canceling state 302 when the cancel complete event 314 is received.

If, however, when the printer controller is in the canceling state 302 and a print request event 315 is received to print another job (e.g., from the same host computer or from another host computer), the printer controller enters the printing and canceling state 303. In this state, the printer controller controls the buffer memory 101 and the print engine 102 to receive and print the newly received print job (the second print job), while at the same time canceling the first print job (i.e. continuing to receive data for the first print job without printing the data, and flushing the data out of the buffer memory).

From the printing and canceling state 303, if a print complete event 316 is received, i.e., if the second job is completely printed before the first job is completely canceled, the printer controller returns to the canceling stated 302 and continues to cancel the first job. The printer controller subsequently returns to the idle state 304 when the first job is completely canceled and the cancel complete event 314 is received. If, when the printer controller is in the printing and canceling state 303, a cancel complete event 317 is received, i.e., the first job is completely cancelled before the second job is completely printed, the printer controller enters the printing state 301 and continues to print the second job. The printer controller subsequently returns to the idle state 304 when the second job is completely printed and the print complete event 312 is received.

Figures 5A, 5B:
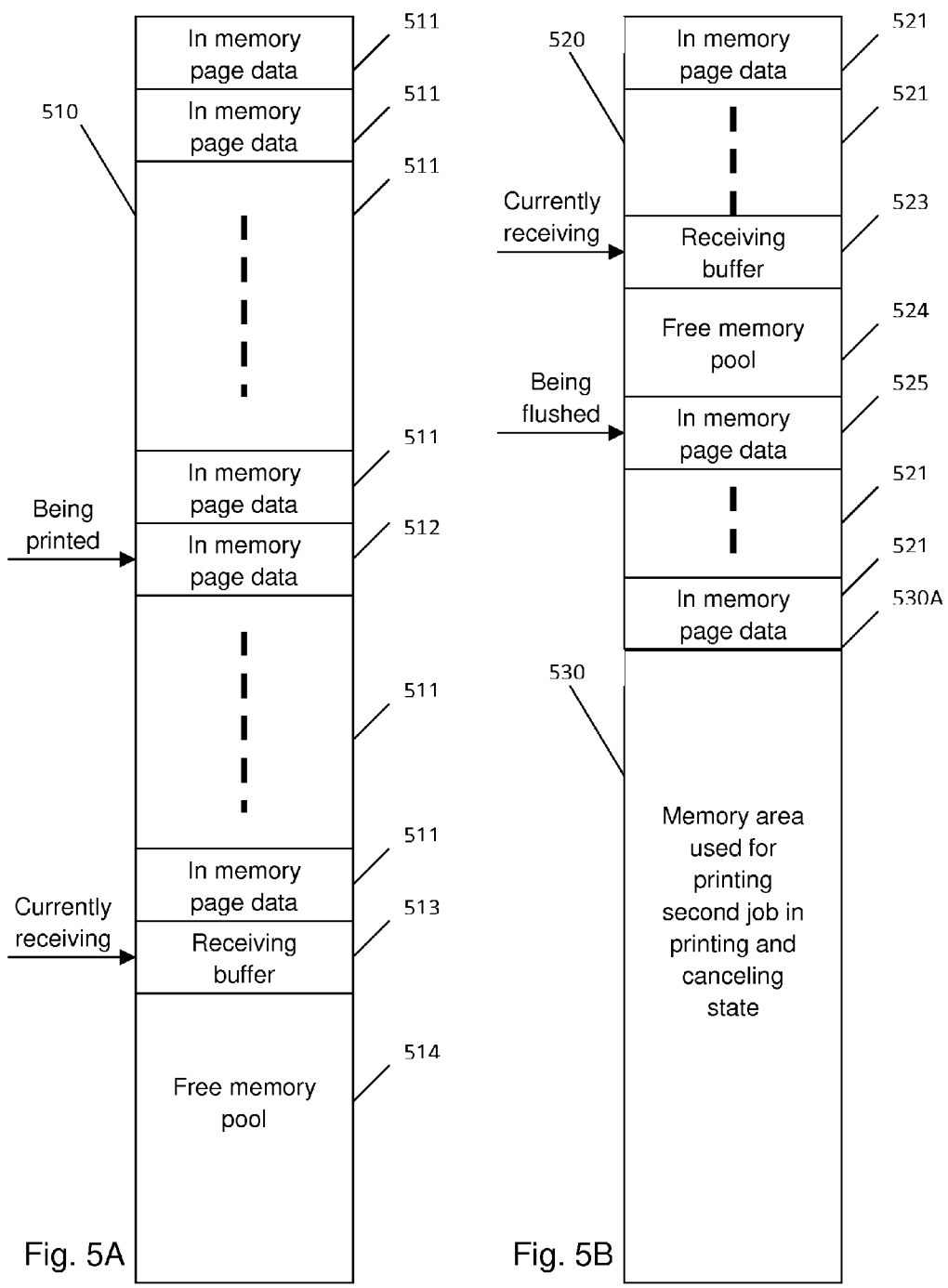
FIGS. 5A and 5B are memory maps illustrating allocation of the buffer memory when the printer controller is in various states.

The job canceling method according to embodiments of the present invention manipulates memory allocation to accomplish printing of a second job while a first job is being canceled. FIG. 5A is a memory map schematically illustrating allocation of the buffer memory 101 for a normal printing job, i.e., when the printer controller is in the printing state 301. The entire bar 510 represents the memory reserved for this job. A number of pages of print data (page data) 511, each corresponding to one page of raster image data along with PDL data if present, are stored in the memory. (Here the reference numerals 511, 512 and 513 indicate either the page data or the memory location storing the page data, depending on context.) FIG. 5A shows that one of the pages, represented by page data 512, is currently being printed. In other words, the print engine accesses this memory location 512 to retrieve data to print. The pages 511 above the page 512 have been printed. FIG. 5A also shows a memory location 513 where page data is currently being received. Memory area 514 is indicated as free memory pool, available for receiving additional page data. In this example, the print job had not consumed all memory allocated to the job.

FIG. 5B is a memory map schematically illustrating the allocation of the buffer memory 101 when the printer controller is in the canceling state 302 or in the printing and canceling state 303, i.e., when it is canceling a first job, or canceling a first job while printing a second job. This memory map is explained below in conjunction with the description of FIG. 4.

Figure 4:
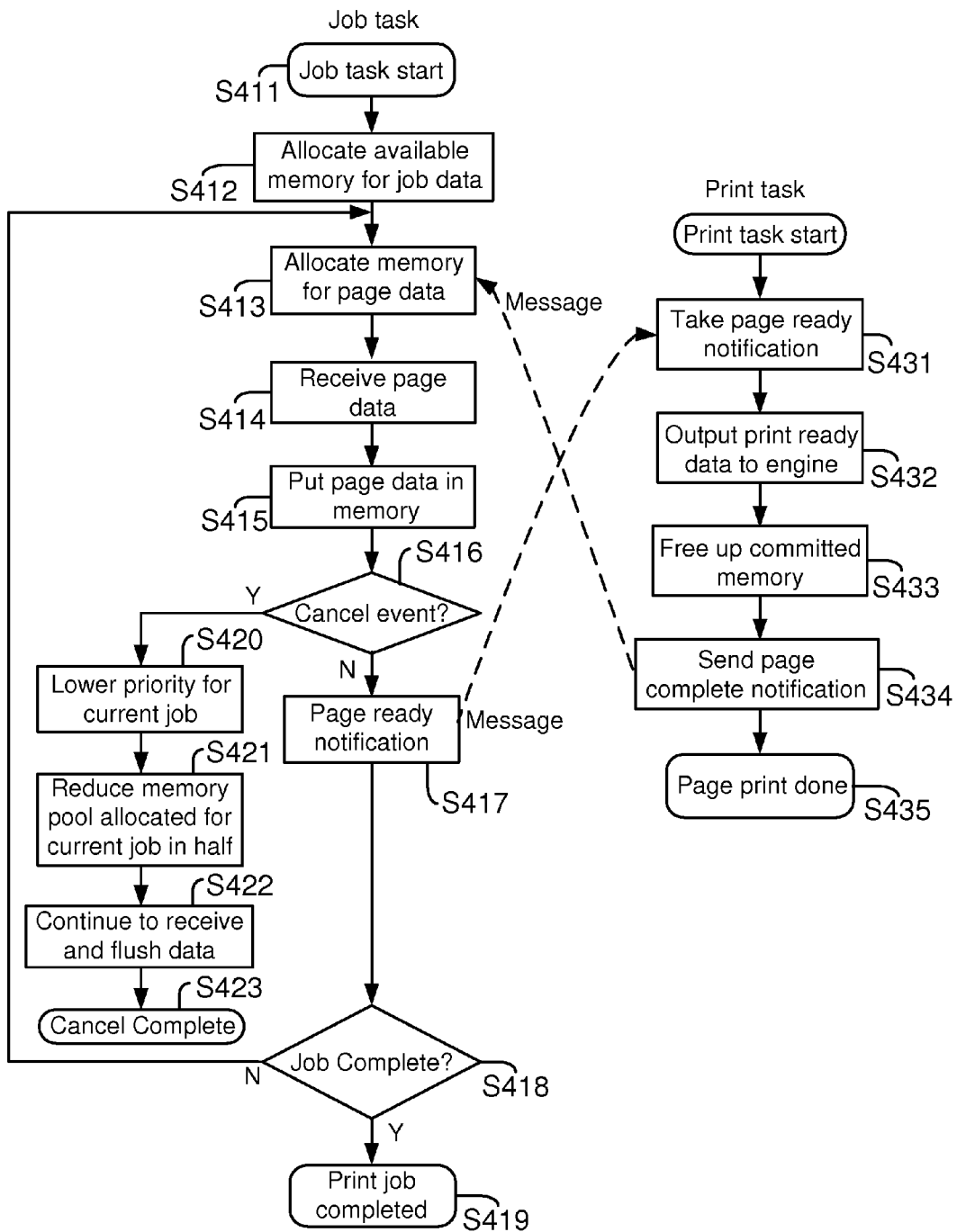
FIG. 4 is a flow chart illustrating a job task and a print task executed by the printer controller.

FIG. 4 is a flow chart illustrating a job task and a print task executed by the printer controller 110, specifically, the job manager section 113 of the printer controller. The job task starts (step S41) when the printer controller enters the printing state 301 from the idle state 304 when a print request 311 is received. The job task allocates memory available to store job data for the current job (step S412). For example, the job task may allocate 100% or 50% of the total memory for the current job. The job task then allocates the memory for the page data (both raster data and PDL data) for the next page (step S413). The size of the memory for each page data is estimated based on the paper size and other factors. The job task then receives, from the host computer, one page of print data for the next page (step S414), and places the page data in the memory (step S415).

At this time, the job task determines if a cancel event has been received (step S416), i.e., if the user has requested to cancel the current print job using the operation control unit 103 of the printer. If not ("N" in step S416), the job task sends a page ready notification to the print task (step S417) to notify the print task that the page data is in memory and ready for processing by the print task. If the print job is complete (i.e. all data have been received from the host) ("Y" in step S418), the process terminates (step S419). If the print job is not complete ("N" in step S418), the process returns to step S413 for the next page.

Meanwhile, the print task prints the page data that has been placed in the memory. The print task receives the page ready notification from the job task (step S431), processes the data received from the host (if necessary) and outputs print-ready data for that page to the print engine (step S432), frees up the committed memory after receiving an acknowledgement from the engine that it has successfully read and printed the page (step S433), and sends a page print complete notification to the job task (step S434). The notification indicates to the job task that memory has been freed up and available to the job task. The print task then returns to step S431 to determine whether another page is ready to be printed.

In the example shown in FIG. 4, the job task and print task are executed as separate threads that send messages (notifications) to each other. The print task prints a page (step S432 and S433) after receiving the page ready notification from the job task indicating that a page is ready to be printed (step S431). The job task allocates the memory that has been freed up after receiving the page print complete message from the print task. It should be noted that when the memory is not constrained, i.e., when there is a free memory pool 514 available for the current print job, the jog task can continue to receive page data from the host computer (steps S413 to S415) without waiting for a page complete notification from the print task. In the case the memory available for the current job is exhausted, the job task must wait until a page is printed and memory is freed up by the print task (i.e. a page complete notification is received from the print task) before the job task can receive the next page of data from the host computer. Alternatively, the job task may wait for a number of pages to be printed and the memory freed up, and then receive a number of new pages from the host computer.

Referring back to step S416, if the jot task determines that a cancel event has been received ("Y" in step S416), the printer controller enters the canceling state 302 to cancel the current job. The job task lowers the priority of the current job (step S421) (the current job was initially assigned a higher priority when the job task was initiated). For example, the CPU time allowed for the current job may be reduced. Assigning of priority may be accomplished in various ways generally known in the art. The job task also reduces the size of the memory allocated to the current job (step S421). In one embodiment, the size of the memory allocated to the current job is reduced by a half. At this point, if the current job has already taken an amount of memory greater than the new memory size allocated to it, the job task halts the receiving of data from the host, and flushes page data already placed in the memory until the total size of memory taken by the current job is less than the new memory size allocated to it.

FIG. 5B schematically illustrates the memory map for the current job after the memory allocated to it has been reduced. In this illustrative example, the entire bar corresponds to the bar 510 in FIG. 5A, and represents the memory available for printing jobs. The memory area 520 above the line 530A, including areas 521, 523, 524 and 525, represents the memory allocated to the current job (the job being canceled) after step S421, which is one half of the size of the memory previously allocated to this job (see FIG. 5A). Using the memory area 520, the job task continues to receive page data from the host and flush the already received page data (step S422). Note that after the job task takes the "Y" branch in step S416 (i.e. a cancel event is received), the job task no longer sends the page ready notification to the print task, and as a result the data that is received in step S422 is not printed. The memory area 523 indicates the area where page data currently being received is placed, and the memory area 525 indicates the in memory page data currently being flushed. The memory area 524 indicates a free memory pool.

The area 530 below the line 530A (one half of the size of the entire memory area in this example, and non-overlapping with the memory area 520) can now be used for another incoming print job if one is received. During the time that the job task is canceling the current job, i.e. executing step S422, if another print job (the second job) is received, the printer controller enters the printing and canceling state 303. In this state, two job tasks (separate threads) are executed simultaneously, a first one for canceling the first job (the current job), and a second one for printing the second job. The printing of the second job is assigned a higher initial priority when the second job task is initiated. The job task for the second job proceeds in the same way as shown in FIG. 4. It allocates the memory area 530 is to the second job, and that memory area is utilized for the second print job in a similar manner as the memory area 510 is utilized for the first print job as shown in FIG. 5A, although the size of the available memory area 530 is one half of the size of the memory area 510.

Referring back to FIG. 4 for the first print job, after all print data for that job is received from the host and flushed from the buffer memory, the first job is successfully canceled (step S423). At this point, if a second job is being printed, the printer controller enters the printing state 301 and the job task for the second print job continuous to be executed. If no second job is being printed at the time the first job is completely cancelled (at step S423), the printer controller enters the idle state 304.

It should be noted that in FIGS. 5A and 5B the various memory locations are schematically illustrated in a continuous and sequential manner for ease of understanding. The actual memory allocation need not be continuous or sequential. For example, in FIG. 5B, the memory areas for the first and the second print job need not be in contiguous areas. The actual allocation of physical memory is typically handled by the operating system.

An advantage of the job canceling method according to embodiments of the present invention is that it does not require the host computer to cooperate with the printer to cancel the print job already submitted by the host computer.

It will be apparent to those skilled in the art that various modification and variations can be made in the job canceling method of the present invention without departing from the spirit or scope of the invention. Thus, it is intended that the present invention cover modifications and variations that come within the scope of the appended claims and their equivalents.

What is claimed is:

1. A printing method executed by a printer, comprising:
   (a) allocating a first memory area for a first print job;
   (b) receiving from a first host a plurality of pages of print data for the first print job and placing the pages of print data within the first memory area;
   (c) printing the pages of print data in the first memory area;
   (d) determining whether a cancel request to cancel the first print job is received from a control panel of the printer; and
   (e) if the cancel request is received,
      (e1) allocating a second memory area for the first print job, the second memory area being smaller than the first memory area; and
      (e2) continuing to receive from the first host a plurality of pages of print data for the first print job, placing the pages of print data within the second memory area, and flushing the print data from the second memory area without printing the print data.

2. The method of claim 1, wherein the print data includes raster image data.

3. The method of claim 1, wherein the second memory area is one half of the first memory area.

4. The method of claim 1, wherein step (e) is performed without notifying the first host.

5. The method of claim 1, further comprising, while performing step (e2):
   (f) allocating a third memory area for a second print job, the third memory area being smaller than the first memory area;
   (g) receiving from a second host a plurality of pages of print data for the second print job and placing the pages of print data within the third memory area; and
   (h) printing the pages of print data in the third memory area.

6. The method of claim 5, wherein the second memory area is one half of the first memory area and the third memory area is one half of the first memory area.

7. A printer comprising:
   a printer controller;
   a buffer memory;
   a print engine for forming images on recording media; and
   an operation control unit for receiving commands from a user;
   wherein the printer controller is programmed (a) to allocate a first memory area of the buffer memory for a first print job, (b) to receive from a first host a plurality of pages of print data for the first print job and place the pages of print data within the first memory area, (c) to print the pages of print data in the first memory area, (d) to determine whether a cancel request to cancel the first print job is received from the operation control unit, and (e) if the cancel request is received, (e1) to allocate a second memory area for the first print job, the second memory area being smaller than the first memory area, and (e2) to continue to receive from the first host a plurality of pages of print data for the first print job, place the pages of print data within the second memory area, and flush the print data from the second memory area without printing the print data.

8. The printer of claim 7, wherein the print data includes raster image data.

9. The printer of claim 7, wherein the second memory area is one half of the first memory area.

10. The printer of claim 7, wherein the printer controller performs step cancels the first print job without notifying the first host.

11. The printer of claim 7, wherein the printer controller is further programmed (f) to allocate a third memory area for a second print job, the third memory area being smaller than the first memory area, (g) to receive from a second host a plurality of pages of print data for the second print job and place the pages of print data within the third memory area, and (h) print the pages of print data in the third memory area.

12. The printer of claim 11, wherein the second memory area is one half of the first memory area and the third memory area is one half of the first memory area.

13. A computer readable non-transitory medium having a computer readable code embodied therein for controlling a printer, the computer readable program code comprising code configured to cause the printer to execute a printing process comprising the steps of:
   (a) allocating a first memory area for a first print job;
   (b) receiving from a first host a plurality of pages of print data for the first print job and placing the pages of print data within the first memory area;
   (c) printing the pages of print data in the first memory area;
   (d) determining whether a cancel request to cancel the first print job is received from a control panel of the printer; and
   (e) if the cancel request is received,
      (e1) allocating a second memory area for the first print job, the second memory area being smaller than the first memory area; and
      (e2) continuing to receive from the first host a plurality of pages of print data for the first print job, placing the pages of print data within the second memory area, and flushing the print data from the second memory area without printing the print data.

14. The computer readable non-transitory medium of claim 13, wherein the print data includes raster image data.

15. The computer readable non-transitory medium of claim 13, wherein the second memory area is one half of the first memory area.

16. The computer readable non-transitory medium of claim 13, wherein step (e) is performed without notifying the first host.

17. The computer readable non-transitory medium of claim 13, wherein the process further comprises, while performing step (e2):
   (f) allocating a third memory area for a second print job, the third memory area being smaller than the first memory area;
   (g) receiving from a second host a plurality of pages of print data for the second print job and placing the pages of print data within the third memory area; and
   (h) printing the pages of print data in the third memory area.

18. The computer readable non-transitory medium of claim 17, wherein the second memory area is one half of the first memory area and the third memory area is one half of the first memory area.